United States Patent
Teyeb et al.

(10) Patent No.: US 11,838,978 B2
(45) Date of Patent: *Dec. 5, 2023

(54) NR PDCP PRESERVATION UPON RRC RESUME/SUSPEND

(71) Applicant: Telefonaktiebolaget LM Ericsson (PUBL), Stockholm (SE)

(72) Inventors: Oumer Teyeb, Montréal (CA); Gunnar Mildh, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/875,714

(22) Filed: Jul. 28, 2022

(65) Prior Publication Data

US 2022/0369409 A1  Nov. 17, 2022

Related U.S. Application Data

(63) Continuation of application No. 16/648,262, filed as application No. PCT/IB2018/057064 on Sep. 14, 2018, now Pat. No. 11,523,456.

(Continued)

(51) Int. Cl.
  *H04W 76/25* (2018.01)
  *H04W 80/02* (2009.01)

(52) U.S. Cl.
  CPC ............ *H04W 76/25* (2018.02); *H04W 80/02* (2013.01)

(58) Field of Classification Search
  CPC .............................. H04W 76/25; H04W 80/02
  See application file for complete search history.

(56) References Cited

U.S. PATENT DOCUMENTS

2019/0037632 A1* 1/2019 Uchino .................. H04W 76/27
2019/0342804 A1* 11/2019 Futaki ............... H04W 36/0069

FOREIGN PATENT DOCUMENTS

| KR | 20170041658 A | 4/2017 |
| WO | 2017119377 A1 | 7/2017 |
| WO | 2017 133678 A1 | 8/2017 |

OTHER PUBLICATIONS

R2-1713388 Ericsson "LTE re-establishment when using NR PDCP" Nov. 27-Dec. 1, 2017 Reno, Nevada (Year: 2017).*

(Continued)

*Primary Examiner* — Basil Ma
(74) *Attorney, Agent, or Firm* — BAKER BOTTS L.L.P.

(57) ABSTRACT

According to some embodiments, a method for use in a user equipment (UE) of resuming a radio bearer in a wireless communication network comprises: establishing a radio resource control (RRC) connection with a first network node; receiving a connection suspend message from the first network node; storing a configuration of a radio bearer associated with the RRC connection; suspending the radio bearer associated with the RRC connection; receiving a connection resume message; determining whether the connection resume message includes configuration information for NR packet data convergence protocol (PDCP) for the suspended radio bearer; upon determining the connection resume message includes configuration information for a NR PDCP, configuring the suspended radio bearer with the configuration information; and resuming the suspended radio bearer.

14 Claims, 12 Drawing Sheets

Related U.S. Application Data

(60) Provisional application No. 62/565,067, filed on Sep. 28, 2017.

(56) References Cited

OTHER PUBLICATIONS

R2-1713388 Ericsson "LTE re-establishment when using NR PDCP" 3GPP WG2 #100 Reno Nov. 27-Dec. 1, 2017 (Year: 2017).*

3GPP, "3rd Generation Partnership Project; Technical Specification Group Radio Access Network; Evolved Universal Terrestrial Radio Access (E-UTRA); Radio Resource Control (RRC); Protocol specification (Release 14)", Technical Specification, Sep. 2017, pp. 1-753, 3GPP, France.

3GPP, "3rd Generation Partnership Project; Technical Specification Group Radio Access Network; NR; Radio Resource Control (RRC); Protocol specification (Release 15)", Technical Specification, 3GPP TS 38.331 V0.0.5, Aug. 31, 2017, pp. 1-38, 3GPP, France.

3GPP, "3rd Generation Partnership Project; Technical Specification Group Services and System Aspects; Study on architecture enhancements for Cellular Internet of Things (Release 13)", Technical Specification, 3GPP TR 23.720 V13.0.0, Mar. 15, 2016, pp. 1-98, 3GPP, France.

Ericsson, "INACTIVE to CONNECTED state transitions," 3GPP TSG-RAN WG2 #98, Spokane, USA, Apr. 3-7, 2017, pp. 1-6, Tdoc R2-1702808, 3GPP.

Ericsson, "RRC Connection Suspend and Resume", 3GPP TSG-RAN WG2 NB-IOT Ad-hoc Meeting, Budapest, Hungary, Jan. 19-21, 2016, 14 pages, R2-160475, 3GPP.

Huawei et al., "LTE RRC design for EN-DC", 3GPP TSG-RAN WG2 NR#99, Berlin, Germany, Aug. 21-25, 2017, pp. 1-4, R2-1709616, 3GPP.

Intel Corporation, "Email discussion report on [98#30][NR] RRC Connection Control", 3GPP TSG RAN WG2 Meeting #99, Berlin, Germany, Aug. 21-25, 2017, pp. 1-58, R2-1708799 (Revision R2-1707038), 3GPP.

Intel Corporation, "Security optimizations when resuming or re-establishing an RRC connection", 3GPP TSG RAN WG2 Meeting #98, Hangzhou, China, May 15-19, 2017, pp. 1-4, R2-1704773, 3GPP.

LG Electronics Inc., "Handling of radio bearers and security for data transmission in RRC_Inactive", 3GPP TSG RAN WG2 Meeting #99, Berlin, Germany, Aug. 21-25, 2017, pp. 1-3, R2-1708459 (resubmission of R2-1705650/R2-1707146), 3GPP.

First Office Action issued for Chinese Patent Application No. 201880063302.X—dated Dec. 27, 2022.

Search Report issued for Chinese Patent Application No. 201880063302.X—dated Dec. 16, 2022.

* cited by examiner

NR PDCP PRESERVATION UPON RRC RESUME/SUSPEND

PRIORITY

This nonprovisional application is a continuation, under 35 U.S.C. § 120, of U.S. patent application Ser. No. 16/648,262 filed on Mar. 18, 2020, which is a U.S. National Stage Filing under 35 U.S.C. § 371 of International Patent Application Serial No. PCT/IB2018/057064 filed Sep. 14, 2018, and entitled "NR PDCP PRESERVATION UPON RRC RESUME/SUSPEND" which claims priority to U.S. Provisional Patent Application No. 62/565,067 filed Sep. 28, 2017, all of which are hereby incorporated by reference in their entirety.

TECHNICAL FIELD

Particular embodiments are directed to wireless communications and, more particularly, to preserving new radio (NR) packet data convergence protocol (PDCP) connections upon resuming a suspended radio resource control (RRC) connection.

INTRODUCTION

Third Generation Partnership Project (3GPP) defines a fifth generation (5G) of wireless communication that includes new radio (NR). In a typical wireless, cellular, or radio communications network, wireless devices, also known as mobile stations, terminals, and/or User Equipment (UE), communicate via a Radio-Access Network (RAN) with one or more core networks. The RAN covers a geographical area that is divided into cells. Each cell is served by a base station (e.g., a radio base station (RBS), or network node, which in some networks may also be referred to as, for example, a "NodeB", "eNodeB" or "eNB"). A cell is a geographical area where radio coverage is provided by the radio base station at a base station site or an antenna site in case the antenna and the radio base station are not collocated. One radio base station may serve one or more cells.

Specifications for the evolved packet system (EPS) have been completed within the 3GPP and this work continues in the coming 3GPP releases. The EPS comprises the evolved universal terrestrial radio-access network (E-UTRAN), also known as long term evolution (LTE), radio access, and the evolved packet core (EPC), also known as system architecture evolution (SAE) core network. E-UTRAN/LTE is a variant of a 3GPP radio-access technology wherein the radio base station nodes are directly connected to the EPC core network rather than to RNCs. In general, in E-UTRAN/LTE the functions of a RNC are distributed between the radio base station nodes (e.g., eNodeBs in LTE) and the core network. The RAN of an EPS has an essentially flat architecture comprising radio base station nodes without reporting to RNCs.

Radio resource control (RRC) may be used in the control plane. The main functions of the control plane include the following: broadcast of system information for both non-access stratum (NAS) and access stratum (AS) paging; RRC connection handling; allocation of temporary identifiers for the UE; configuration of signaling radio bearer(s) for RRC connection; handling of radio bearers; quality-of-service (QoS) management functions; security functions including key management; mobility functions (including UE measurement reporting and control of the reporting, handover, UE cell selection and reselection and control of cell selection and reselection); and NAS direct message transfer to/from the UE.

One packet data convergence protocol (PDCP) entity exists for each radio bearer for the UE. PDCP is used for both control plane (i.e., RRC) and for user plane (i.e., user data received via GPRS tunneling protocol-user tunneling (GTP-U) signaling). A main function of the control plane is ciphering/deciphering and integrity protection. Main functions of the user plane include: ciphering/deciphering, header compression and decompression using robust header compression (ROHC) and in-sequence delivery, duplicate detection and retransmission.

LTE includes a dual connectivity feature. E-UTRAN supports dual connectivity (DC) operation whereby a multiple Rx/Tx UE in RRC_CONNECTED is configured to utilize radio resources provided by two distinct schedulers, located in two eNBs connected via a non-ideal backhaul over the X2 interface (see 3GPP 36.300). An eNB involved in DC for a certain UE may assume two different roles: an eNB may either act as an MN (Master node) or as an SN (Secondary node). In DC, a UE is connected to one MN and one SN.

In LTE DC, the radio protocol architecture that a particular bearer uses depends on how the bearer is setup. Three bearer types exist: MCG (Master Cell Group) bearer, SCG (Secondary Cell Group) bearer and split bearers. RRC is located in MN and SRBs (Signaling Radio Bearers) are always configured as MCG bearer type and therefore only use the radio resources of the MN. An example is illustrated in FIG. 1.

FIG. 1 is a block diagram illustrating the LTE dual connectivity user plane. The master node includes a MCG bearer and a split bearer. The secondary node includes a SCG bearer.

LTE NR also includes dual connectivity. LTE-NR (New Radio) DC may also be referred to as LTE-NR tight interworking. The major changes from LTE DC are: (a) the introduction of split bearer from the SN (known as SCG split bearer); (b) the introduction of split bearer for RRC; and (c) the introduction of a direct RRC from the SN (also referred to as SCG SRB). Examples are illustrated in FIGS. 2 and 3.

FIG. 2 is a block diagram illustrating LTE-NR tight interworking user plane. The master node includes a MCG bearer and a MCG split bearer. The secondary node includes a SCG bearer and a SCG split bearer.

FIG. 3 is a block diagram illustrating LTE-NR tight interworking control plane. FIG. 3 illustrates protocol layer interaction between the master node, secondary node, and user equipment.

The SN is sometimes referred to as SgNB (where gNB is an NR base station), and the MN as MeNB in case the LTE is the master node and NR is the secondary node. In the other case where NR is the master and LTE is the secondary node, the corresponding terms are SeNB and MgNB.

Split RRC messages are mainly used for creating diversity, and the sender can decide to either choose one of the links for scheduling the RRC messages, or it can duplicate the message over both links. In the downlink, the path switching between the MCG or SCG legs or duplication on both is left to network implementation. On the other hand, for uplink, the network configures the UE to use the MCG, SCG or both legs. The terms "leg" and "path" are used interchangeably herein.

The following terminologies are used to differentiate different dual connectivity scenarios: DC: LTE DC (i.e., both MN and SN employ LTE); EN-DC: LTE-NR dual connectivity where LTE is the master and NR is the secondary; NE-DC: LTE-NR dual connectivity where NR is the master and LTE is the secondary; NR-DC (or NR-NR DC): both MN and SN employ NR; and MR-DC (multi-RAT DC): a generic term to describe where the MN and SN employ different RATs (EN-DC and NE-DC are two different example cases of MR-DC)

NR harmonizes what were formerly called MCG bearers, MCG split bearers, SCG bearers and SCG split bearers in the following way. It is possible to configure the UE to use NR PDCP for all the bearers (even when the UE is operating in standalone LTE mode and EN-DC is not setup). For all bearers configured with NR PDCP, it is possible to configure the UE to either use KeNB or S-KeNB as security key. The configuration of the PDCP layers is separated from the configuration of the lower layers of the MCG and SCG leg.

From a UE point of view, there are only 3 different bearers (as seen in FIG. 4) namely: (a) the MCG bearer which uses the radio of the MN node only; (b) the SCG bearer which uses the radio of the SN node only; and (c) the split bearer which uses the radio of both the MN and SN.

FIG. 4 is a block diagram illustrating three dual connectivity bearers from the perspective of a user equipment. Where the bearers are terminated in the network is not important from the UEs perspective anymore (i.e., the UE will just use the key that is being configured from each bearer). NR supports MCG bearer termination in the SN node using S-KeNB and SCG bearer termination in the MN node. Similarly, it is possible to support both SN and MN terminated bearers at the same time (i.e., both SN terminated split bearers and MN terminated split bearers.)

LTE includes RRC suspend and resume functionality. A suspended UE can be considered to be in an intermediate state between IDLE and CONNECTED, where the UE AS context is kept both at the UE and RAN, and the UE can be seen as if it is in connected mode from the core network (CN) point of view and in IDLE mode from the RAN point of view. An advantage of operating in this mode is reduced signaling towards the CN and faster transition to CONNECTED mode as compared to legacy IDLE-CONNECTED mode transitions, while maintaining the UE power saving advantages of IDLE mode. Both LTE rel-15 and NR may support enhanced version of the suspend/resume functionality (referred to as a lightly connected UE in LTE and inactive mode in NR).

In LTE, when the network decides to move the UE to the inactive state, the eNB sends the UE an RRCConnectionRelease message with the release cause value of rrc-suspend and it is also provided with a Resume ID. The UE stores the resumeIdentity and UE AS context (including the current RRC configuration, the current security context, the PDCP state including ROHC state, C-RNTI used in the source PCell, the cellIdentity and the physical cell identity of the source PCell); re-establishes all RLC entities (both for SRBs and DRBs); and suspends all DRBs and SRBs except SRB0. An example is illustrated in FIG. 5.

FIG. 5 is a sequence diagram illustrating the RRC connection suspend procedure. At step 1, based on some triggers (e.g., the expiry of a UE inactivity timer) the eNB decides to suspend the RRC connection. At step 2, the eNB initiates the S1-AP UE Context Suspend procedure to inform the MME that the RRC connection is being suspended. At step 3, the MME requests the S-GW to release all S1-U bearers for the UE. At step 4, the MME Acks step 2. At step 5, the eNB suspends the RRC connection by sending an RRCConnectionRelease message with the releaseCause set to rrc-Suspend. The message includes the resumeIdentity which is stored by the UE. At step 6, the UE stores the AS context, suspends all SRBs and DRBs, and UE enters RRC_IDLE light connected state.

When the UE later wants to resume the connection (in response to uplink data to be sent or a paging request for downlink data), it sends an RRCConnectionResumeRequest message with the saved resumeIdentity. The eNB responds with an RRCConnectionResume message, and both the UE and eNB restore the saved UE context, and data transmission/reception from/to the UE can be resumed.

The resume operation can be performed in an eNB other than the eNB that was serving the UE when the UE was suspended. In that case, the new eNB can perform a context fetch e.g., by using the Retrieve UE Context procedure from the old eNB (as the resumeIdentity includes information about the old eNB/cell). Examples are illustrated in FIGS. 6 and 7.

FIG. 6 is a sequence diagram illustrating the RRC connection resume procedure in the same eNB. At step 1, at some later point in time (e.g., when the UE is being paged or when new data arrives in the uplink buffer) the UE resumes the connection by sending an RRCConnectionResumeRequest to the eNB. The UE includes its Resume ID, the establishment cause, and authentication token. The authentication token is calculated in the same way as the short MAC-I used in RRC connection re-establishment and allows the eNB to verify the UE identity.

At step 2, provided that the Resume ID exists, and the authentication token is successfully validated, the eNB responds with an RRCConnectionResume. The message includes the next hop chaining count (NCC) value which is required to re-establish the AS security.

At step 3, the UE resumes all SRBs and DRBs and re-establishes the AS security. The UE is now in RRC_CONNECTED. At step 4, the UE responds with an RRCConnectionResumeComplete confirming that the RRC connection was resumed successfully. At step 5, the eNB initiates the S1-AP Context Resume procedure to notify the MME about the UE state change. At step 6, the MME requests the S-GW to activate the S1-U bearers for the UE. At step 7, the MME Acks step 5.

FIG. 7 is a sequence diagram illustrating the RRC connection resume procedure in a new eNB. Step 1 is the same as step 1 in FIG. 6. At step 2, the new eNB locates the old eNB using the Resume ID and retrieves the UE context by means of the X2-AP Retrieve UE Context procedure. At step 3, the old eNB responds with the UE context associated with the Resume ID.

Steps 4-6 are the same as step 2-4, respectively, in FIG. 6. At step 7, the new eNB initiates the S1-AP Path Switch procedure to establish a S1 UE associated signalling connection to the serving MME and to request the MME to resume the UE context.

At step 8, the MME requests the S-GW to activate the S1-U bearers for the UE and updates the downlink path. At step 9, the MME Acks step 7. At step 10, after the S1-AP Path Switch procedure, the new eNB triggers release of the UE context at the old eNB by means of the X2-AP UE Context Release procedure.

A particular problem is that existing RRC messages cannot correctly handle all the scenarios described above. The contents of the RRCConnectionResume message and the optional RadioResourceConfigDedicated IE included therein are:

| RRCConnectionResume message |
|---|
| ```
-- ASN1START
RRCConnectionResume-r13 ::=        SEQUENCE {
    rrc-TransactionIdentifier                      ,
    criticalExtensions                             CHOICE {
        c1                                             CHOICE {
            rrcConnectionResume-r13                        RRCConnectionResume-r13-IEs,
            spare3 NULL,
            spare2 NULL,
            spare1 NULL
        },
        criticalExtensionsFuture                       SEQUENCE { }
    }
}
RRCConnectionResume-r13-IEs ::=    SEQUENCE {
    radioResourceConfigDedicated-r13               RadioResourceConfigDedicated      OPTIONAL,    -- Need ON
    nextHopChainingCount-r13                       NextHopChainingCount,
    measConfig-r13                                 MeasConfig                        OPTIONAL,    -- Need ON
    antennaInfoDedicatedPCell-r13                  AntennaInfoDedicated-v10i0        OPTIONAL,    -- Need ON
    drb-ContinueROHC-r13                           ENUMERATED {true}                 OPTIONAL,    -- Need OP
    lateNonCriticalExtension                       OCTET STRING                      OPTIONAL,
    nonCriticalExtension                           SEQUENCE { }                      OPTIONAL
}
-- ASN1STOP
``` |

| RadioResourceConfigDedicated information element |
|---|
| ```
-- ASN1START
RadioResourceConfigDedicated ::=   SEQUENCE {
    srb-ToAddModList                   SRB-ToAddModList         OPTIONAL,    -- Cond HO-Conn
    drb-ToAddModList                   DRB-ToAddModList         OPTIONAL,    -- Cond HO-toEUTRA
    drb-ToReleaseList                  DRB-ToReleaseList        OPTIONAL,    -- Need ON
    mac-MainConfig                     CHOICE {
        explicitValue                      MAC-MainConfig,
        defaultValue                       NULL
    }                                  OPTIONAL,                             -- Cond HO-toEUTRA2
    sps-Config                         SPS-Config               OPTIONAL,    -- Need ON
    physicalConfigDedicated                                     OPTIONAL,    -- Need ON
    ...,
    [[  rlf-TimersAndConstants-r9         RLF-TimersAndConstants-r9         OPTIONAL    -- Need ON
    ]],
    [[  measSubframePatternPCell-r10      MeasSubframePatternPCell-r10      OPTIONAL    -- Need ON
    ]],
    [[  neighCellsCRS-Info-r11            NeighCellsCRS-Info-r11            OPTIONAL    -- Need ON
    ]],
    [[  naics-Info-r12                    NAICS-AssistanceInfo-r12          OPTIONAL    -- Need ON
    ]],
    [[  neighCellsCRS-Info-r13            NeighCellsCRS-Info-r13            OPTIONAL,   -- Cond CRSIM
        rlf-TimersAndConstants-r13        RLF-TimersAndConstants-r13        OPTIONAL    -- Need ON
    ]],
    [[  sps-Config-v14xy                  SPS-Config-v14xy                  OPTIONAL    -- Need ON
    ]]
}
``` |

-continued

RadioResourceConfigDedicated information element

```
SRB-ToAddMod ::=    SEQUENCE {
    srb-Identity                       INTEGER (1..2),
    rlc-Config                         CHOICE {
        explicitValue                      RLC-Config,
        defaultValue                       NULL
    }                   OPTIONAL,
                                       -- Cond Setup
    logicalChannelConfig               CHOICE {
        explicitValue
    LogicalChannelConfig,
        defaultValue                       NULL
    }                   OPTIONAL,
                                       -- Cond Setup
    ...
}
DRB-ToAddMod ::=    SEQUENCE {
    eps-BearerIdentity                 INTEGER (0..15)
        OPTIONAL,                      -- Cond DRB-Setup
    drb-Identity                       DRB-Identity,
    pdcp-Config                        PDCP-Config
        OPTIONAL,                      -- Cond PDCP
    rlc-Config                         RLC-Config
        OPTIONAL,                      -- Cond SetupM
    logicalChannelIdentity             INTEGER (3..10)
    OPTIONAL,           -- Cond DRB-SetupM
    logicalChannelConfig               LogicalChannelConfig
    OPTIONAL,           -- Cond SetupM
    ...,
    [[    drb-TypeChange-r12           ENUMERATED
{toMCG}             OPTIONAL,         -- Need OP
        rlc-Config-v1250               RLC-Config-v1250
    OPTIONAL            -- Need ON
    ]],
    [[    rlc-Config-v1310             RLC-Config-v1310
    OPTIONAL,           -- Need ON
        drb-TypeLWA-r13                BOOLEAN
                        OPTIONAL,     -- Need ON
        drb-TypeLWIP-r13               ENUMERATED     {lwip,
lwip-DL-only,
                                                                lwip-UL-
only, eutran}       OPTIONAL         -- Need ON
    ]],
    [[    rlc-Config-v14xy             RLC-Config-v14xy
    OPTIONAL,                         -- Need ON
        lwip-UL-Aggregation-r14        BOOLEAN
                        OPTIONAL,     -- Cond LWIP
        lwip-DL-Aggregation-r14        BOOLEAN
                        OPTIONAL,     -- Cond LWIP
        lwa-WLAN-AC-r14                ENUMERATED {ac-bk, ac-be, ac-vi,
ac-vo}      OPTIONAL    -- Need OP
    ]]
}
```

As can be seen above, the DRB-ToAddMod IE that may be included in the RadioResourceConfigDedicated IE contains an LTE PDCP configuration for the bearers.

Assume that when the UE was suspended, some of the bearers had been using NR PDCP. This could be because the UE was operating in EN-DC mode or it could even have been in standalone LTE mode. NR may allow the configuration of NR PDCP without the UE being in EN-DC as long as it is NR capable. When such a UE is resumed by receiving the RRCResume message depicted above, because the only PDCP configuration that is available is the LTE pdcp-config IE, any bearer that is being resumed will have to use LTE PDCP. Also, because no pdcp-config is included in the SRB-To-AddMod, the SRBs, had they been using NR PDCP before suspension, will not be resumed with NR PDCP.

Thus, a particular problem is that applying the RRC Resume as in legacy LTE results in the implicit conversion of the PDCP type of all suspended bearers in to LTE PDCP upon resumption.

Accordingly, an additional reconfiguration is required to change the PDCP back to NR PDCP. This results in unnecessary interruption because of the PDCP/RLC re-establishments and possibly RLC/MAC reset that may be required for converting the PDCP version from LTE back to NR. The reconfiguration may interrupt the ongoing traffic which could mean that it takes longer time to ramp up the TCP window.

Also, one of the advantages of using NR PDCP, even for standalone LTE, is the possibility to set up the termination point of the concerned bearer either at the MN or SN (transparently to the UE), so that future transitions to EN-DC can be performed without additional CN signaling. With the conversion of all the bearers back to LTE PDCP, the termination point of these bearers have to be changed to the MN (if it was not to begin with), thereby causing unnecessary CN signaling.

Additionally, an error case may happen if the UE was at first in an eNB that supports NR mode, gets suspended, and is resumed in an eNB that does not support NR mode. This is because the pdcp-config to be included in the DRB-ToAddMod is optional, so if the network does not want to change the UE's configuration on resume, it may not include the optional fields. That is, the UE might end up resuming with NR PDCP version, while the serving eNB does not understand NR PDCP. Therefore, communication maybe not be possible between the UE and the eNB after or even during the resumption.

SUMMARY

The embodiments described herein solve particular problems of the current long term evolution (LTE) Resume/Suspend procedure that results in the implicit conversion of all of the user equipment's (UE's) bearers to use LTE packet data convergence protocol (PDCP) upon resumption, even if they were using new radio (NR) PDCP version.

According to some embodiments, a method for use in a user equipment (UE) of resuming a radio bearer in a wireless communication network comprises: establishing a radio resource control (RRC) connection with a first network node; receiving a connection suspend message from the first network node; storing a configuration of a radio bearer associated with the RRC connection; suspending the radio bearer associated with the RRC connection; receiving a connection resume message; determining whether the connection resume message includes configuration information for NR PDCP for the suspended radio bearer; upon determining the connection resume message includes configuration information for a NR PDCP, configuring the suspended radio bearer with the configuration information; and resuming the suspended radio bearer.

In particular embodiments, the established RRC connection includes a NR PDCP bearer or a LTE PDCP bearer. The connection resume message may be received from a second network node that is different than the first network node.

In particular embodiments, configuring the suspended radio bearer comprises using the configuration information in the connection resume message and the stored configuration information. The configuration information in the connection resume message may take precedence over the stored configuration information. The configuration information in the connection resume message may include security information different from the security information used prior to suspension of the radio bearer.

In particular embodiments, the method further comprises, upon determining the connection resume message does not include configuration information for NR PDCP for the suspended radio bearer, resuming the suspended radio bearer as a LTE PDCP bearer. The method may further comprise: establishing a signaling radio bearer 1 (SRB1) NR PDCP connection with the first network node; and upon receiving the connection suspend message, converting (920) the SRB1 connection to a LTE PDCP connection. The connection resume message is received over the SRB1 connection.

According to some embodiments, a UE is capable of resuming a radio bearer in a wireless communication network. The UE comprises processing circuitry operable to: establish a RRC connection with a first network node; receive a connection suspend message from the first network node; store a configuration of a radio bearer associated with the RRC connection; suspend the radio bearer associated with the RRC connection; receive a connection resume message; determine whether the connection resume message includes configuration information for NR PDCP for the suspended radio bearer; upon determining the connection resume message includes configuration information for a NR PDCP, configure the suspended radio bearer with the configuration information; and resume the suspended radio bearer.

In particular embodiments, the established RRC connection includes a NR PDCP bearer or a (LTE PDCP bearer. The connection resume message may be received from a second network node that is different than the first network node.

In particular embodiments, the processing circuitry is operable configure the suspended radio bearer by using the configuration information in the connection resume message and the stored configuration information. The configuration information in the connection resume message may take precedence over the stored configuration information. The configuration information in the connection resume message may include security information different from the security information used prior to suspension of the radio bearer.

In particular embodiments, the processing circuitry is further operable to, upon determining the connection resume message does not include configuration information for a NR PDCP for the suspended radio bearer, resume the suspended radio bearer as a LTE PDCP bearer. The processing circuitry may be further operable to: establish a SRB1 NR PDCP connection with the first network node; upon receiving the connection suspend message and convert the SRB1 connection to a LTE PDCP connection. The processing circuitry is operable to receive the connection resume message over the SRB1 connection.

According to some embodiments, a method for use in a network node of resuming a radio bearer in a wireless communication network comprises: determining to resume, with a UE, a radio bearer associated with a RRC connection; and sending a connection resume message to the user equipment. The connection resume message includes configuration information for NR PDCP for the radio bearer.

In particular embodiments, configuration information for the radio bearer to resume previously included NR PDCP configuration information or LTE configuration information.

In particular embodiments, the method further comprises: receiving capability information for the UE; and determining the UE is capable of supporting NR PDCP based on the capability information. The method may further comprise: establishing a SRB1 NR PDCP connection with the UE; sending a connection suspend message to the UE; and receiving a connection reconfiguration message from the UE reconfiguring the SRB1 from NR PDCP to LTE PDCP.

According to some embodiments, a network node is capable of resuming a radio bearer in a wireless communication network. The network node comprises processing circuitry operable to: determine to resume, with UE, a radio bearer associated with a RRC connection; and send a connection resume message to the user equipment. The connection resume message includes configuration information for NR PDCP for the radio bearer.

In particular embodiments, configuration information for the radio bearer to resume previously included NR PDCP configuration information or LTE configuration information.

In particular embodiments, the processing circuitry is further operable to: receive capability information for the UE; and determine the UE is capable of supporting NR PDCP based on the capability information. The processing circuitry may be further operable to: establish a SRB1 NR PDCP connection with the UE; send a connection suspend message to the UE; and receive a connection reconfiguration message from the UE reconfiguring the SRB1 from NR PDCP to LTE PDCP.

According to some embodiments, a UE is capable of resuming a radio bearer in a wireless communication network. The UE comprises a configuration module and a receiving module. The configuration module is operable to establish a RRC connection with a first network node. The receiving module is operable to receive a connection suspend message from the first network node. The configuration module is further operable to: store a configuration of a radio bearer associated with the RRC connection and suspend the radio bearer associated with the RRC connection. The receiving module is further operable to receive a connection resume message. The configuration module is further operable to: determine whether the connection resume message includes configuration information for NR PDCP for the suspended radio bearer. Upon determining the connection resume message includes configuration information for a NR PDCP, configure the suspended radio bearer with the configuration information and resume the suspended radio bearer.

According to some embodiments, a network node is capable of resuming a radio bearer in a wireless communication network. The network node comprises a configuration module and a transmitting module. The configuration module is operable to determine to resume, with a UE, a radio bearer associated with a RRC connection. The transmitting module is operable to send a connection resume message to the user equipment. The connection resume message includes configuration information for NR PDCP for the radio bearer.

Also disclosed is a computer program product. The computer program product comprises instructions stored on non-transient computer-readable media which, when executed by a processor, perform the steps of: establishing a radio resource control (RRC) connection with a first network node; receiving a connection suspend message from the first network node; storing a configuration of a radio bearer associated with the RRC connection; suspending the radio bearer associated with the RRC connection; receiving a connection resume message; determining whether the connection resume message includes configuration information for NR PDCP for the suspended radio bearer; upon determining the connection resume message includes configuration information for a NR PDCP, configuring the suspended radio bearer with the configuration information; and resuming the suspended radio bearer.

Another computer program product comprises instructions stored on non-transient computer-readable media which, when executed by a processor, perform the steps of: determining to resume, with a UE, a radio bearer associated with a RRC connection; and sending a connection resume message to the user equipment. The connection resume message includes configuration information for NR PDCP for the radio bearer.

Certain embodiments of the present disclosure may provide one or more technical advantages. For example, some embodiments may suspend and resume all the relevant bearers of a UE, while preserving the PDCP version that was being used before suspension, thereby eliminating the need to do further re-configurations or core network signaling to bring the UE's bearers and the corresponding network configuration for that UE to the same configuration they were before the UE's suspension. Eliminating reconfigurations has a significant performance advantage in that the uplink and downlink user data can continue to flow enabling protocols like Transmission Control Protocol (TCP) to speed up the ramp of the TCP windows which increases link utilization. Other advantages may be readily available to one having skill in the art. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Third Generation Partnership Project (3GPP) defines a fifth generation (5G) of wireless communication that includes new radio (NR). NR, similar to long term evolution (LTE), includes dual connectivity. LTE and NR also include radio resource control (RRC) suspend and resume functionality. A particular problem is that LTE RRC messages cannot correctly handle all the scenarios for NR RRC suspend and resume with respect to packet data convergence protocol (PDCP) connections in NR.

Particular embodiments described herein obviate the problems described above and include procedures that prevent the implicit conversion of all of the user equipment's (UE's) bearers to use LTE PDCP upon resumption if the UEs were using NR PDCP before suspension. Some embodiments may suspend and resume all the relevant bearers of a UE, while preserving the PDCP version that was being used before suspension, thereby eliminating the need to do further re-configurations or core network signaling to bring the UE's bearers and the corresponding network configuration for that UE to the same configuration they were before the UE's suspension. Eliminating reconfigurations has a significant performance advantage in that the uplink and downlink user data can continue to flow enabling protocols like TCP to speed up the ramp of the TCP windows which increases link utilization.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 8-12B of the drawings, like numerals being used for like and corresponding parts of the various drawings. LTE and NR are used throughout this disclosure as an example cellular system, but the ideas presented herein may apply to other wireless communication systems as well.

Figure 1:
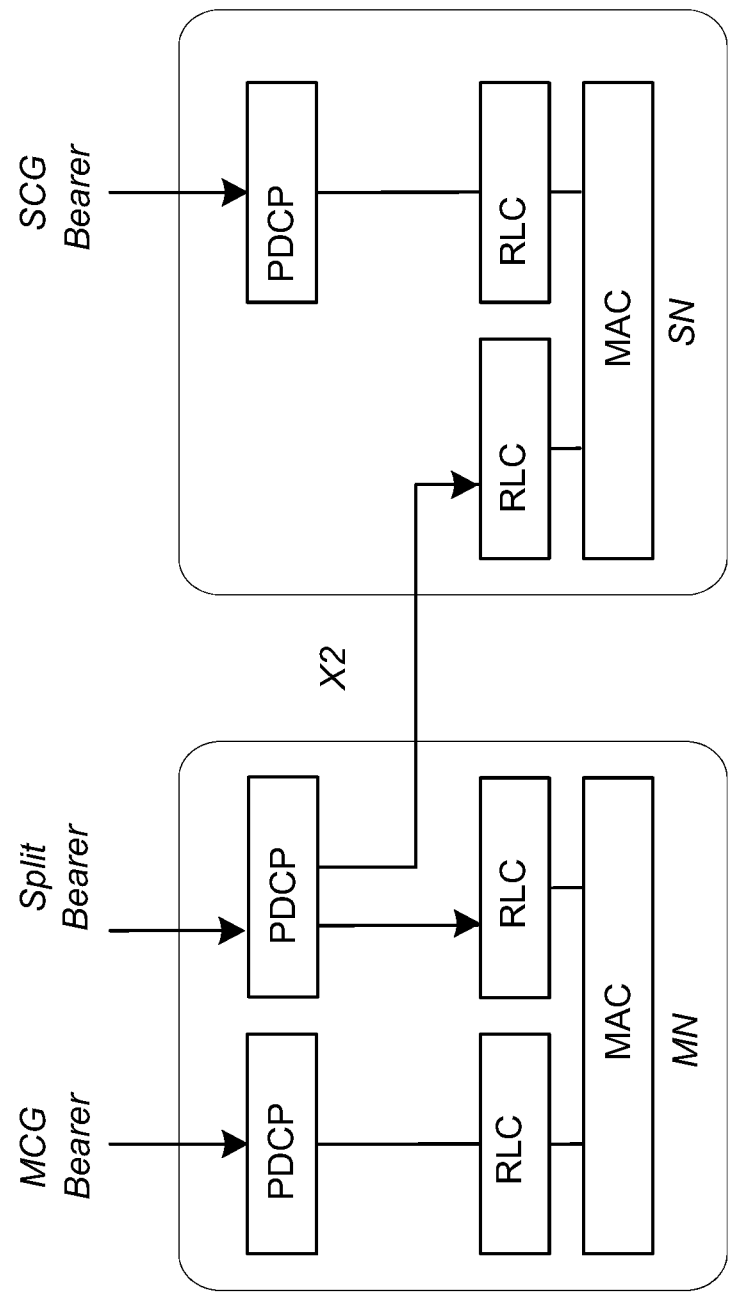
FIG. 1 is a block diagram illustrating the LTE dual connectivity user plane.
Figure 2:
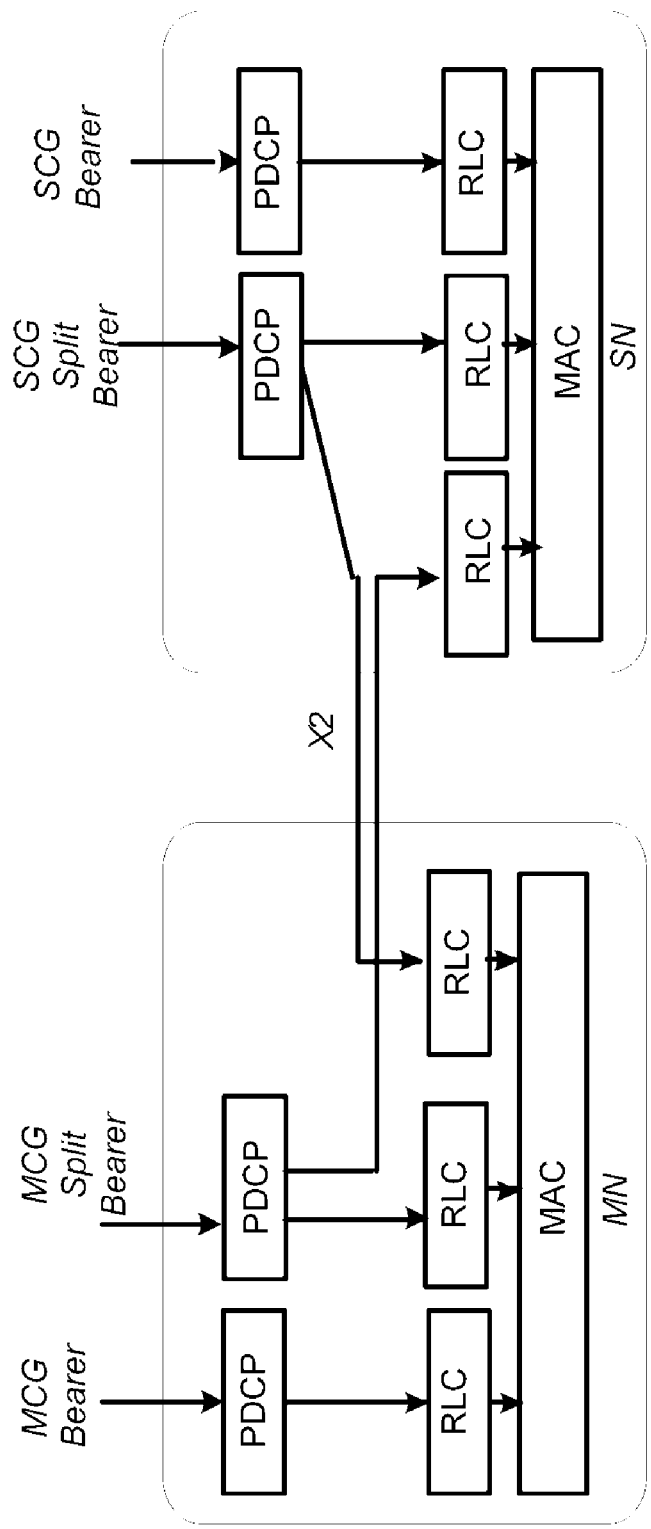
FIG. 2 is a block diagram illustrating LTE-NR tight interworking user plane.
Figure 3:
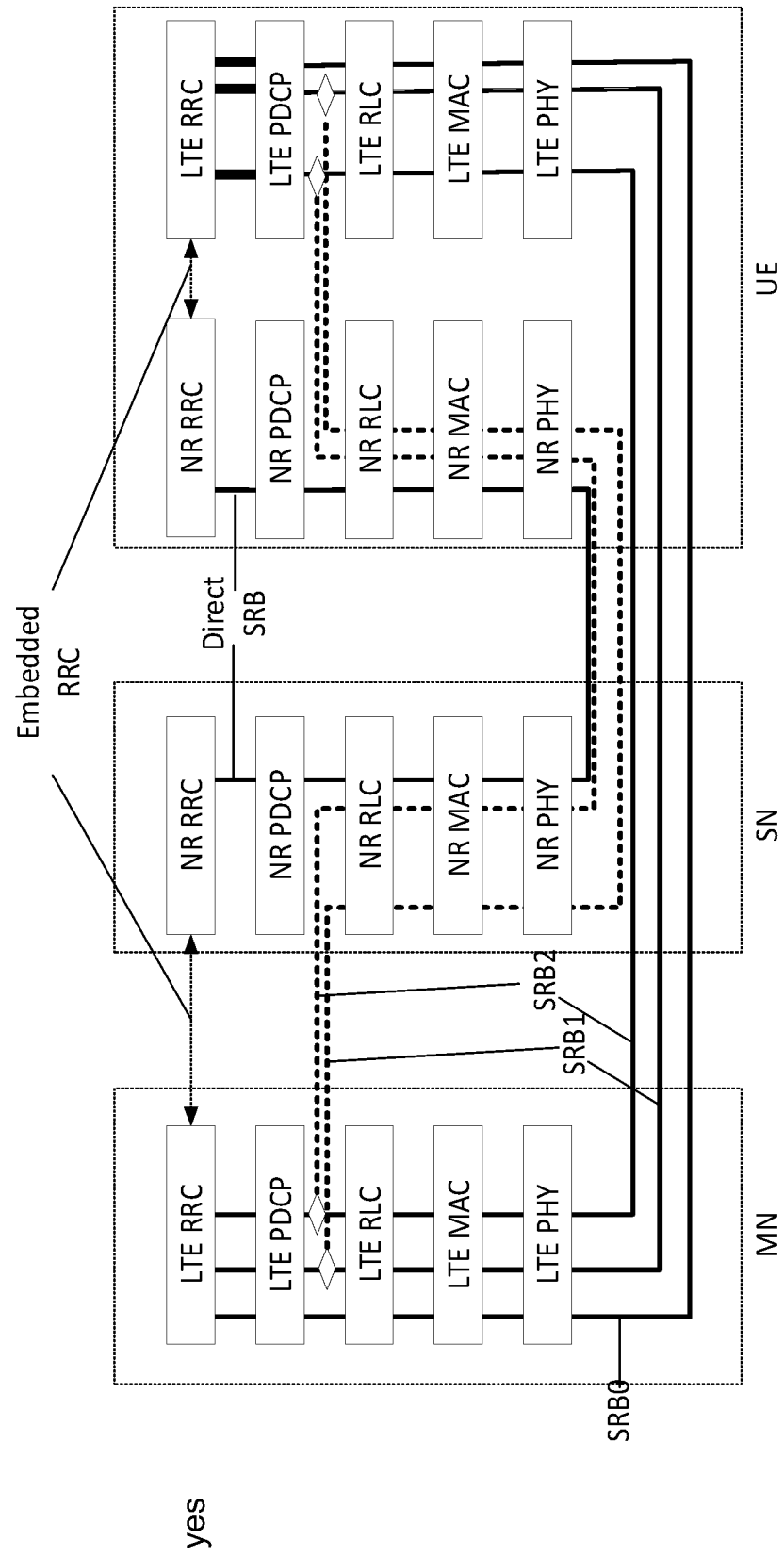
FIG. 3 is a block diagram illustrating LTE-NR tight interworking control plane.
Figure 4:
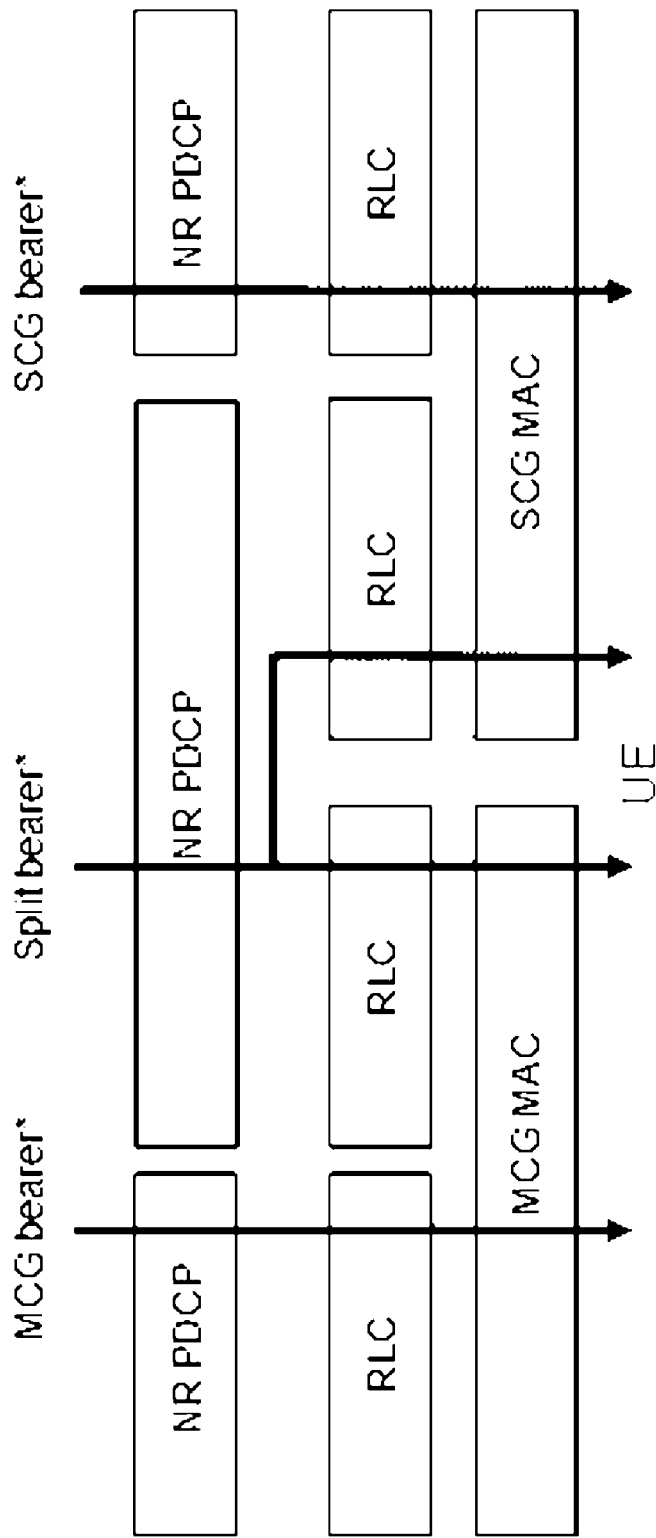
FIG. 4 is a block diagram illustrating three dual connectivity bearers from the perspective of a user equipment.
Figure 5:
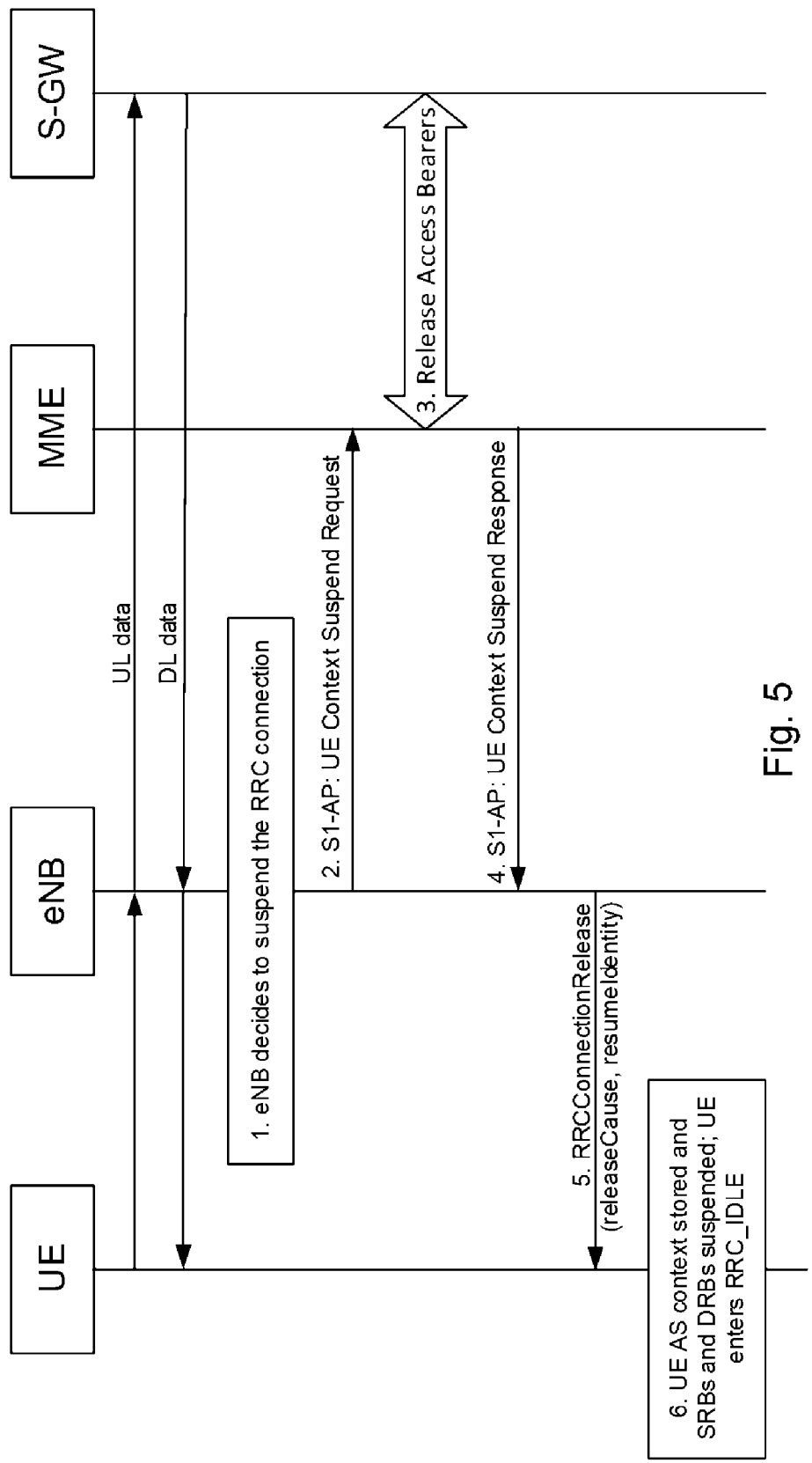
FIG. 5 is a sequence diagram illustrating the RRC connection suspend procedure.
Figure 6:
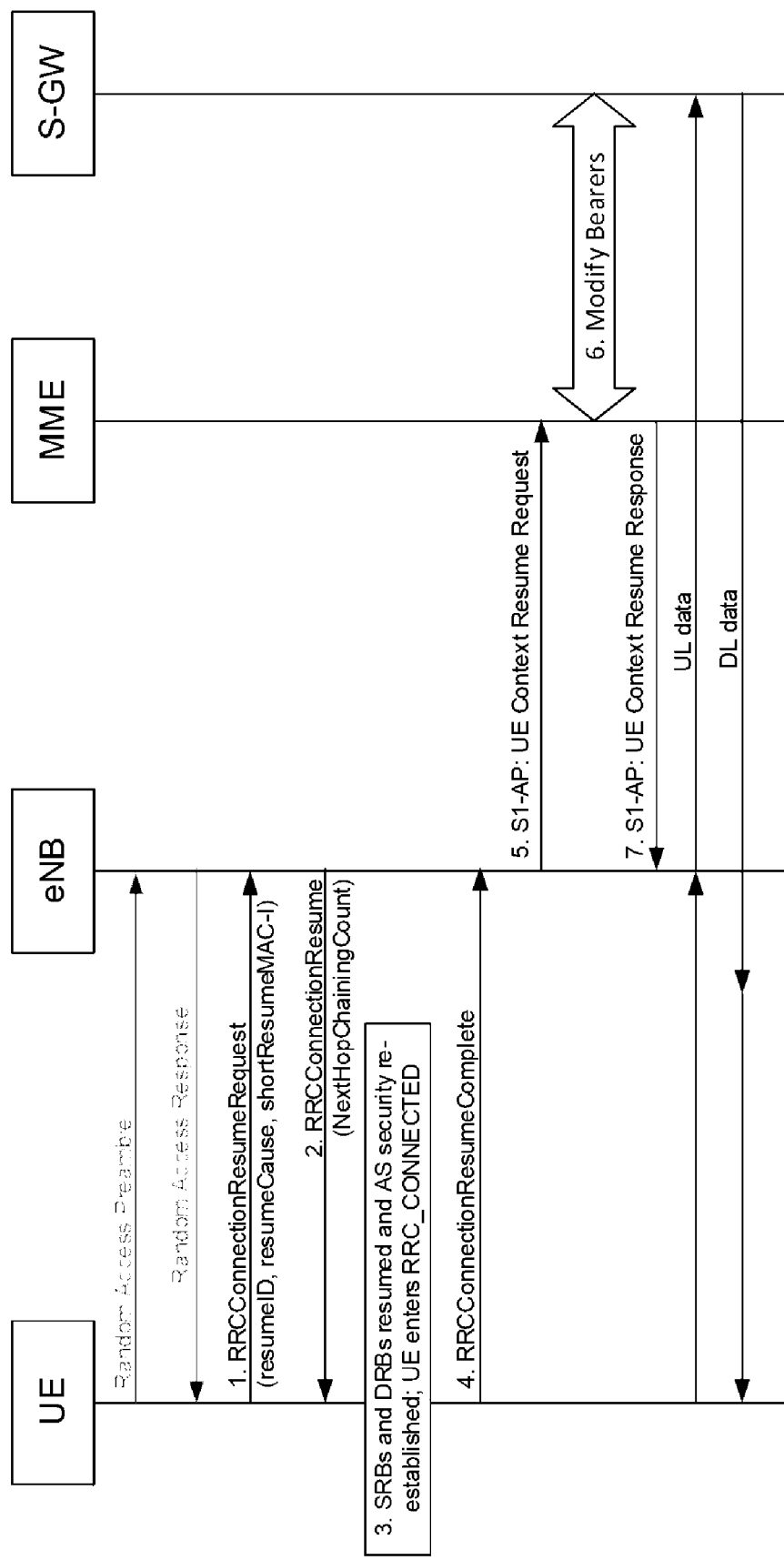
FIG. 6 is a sequence diagram illustrating the RRC connection resume procedure in the same eNB.
Figure 7:
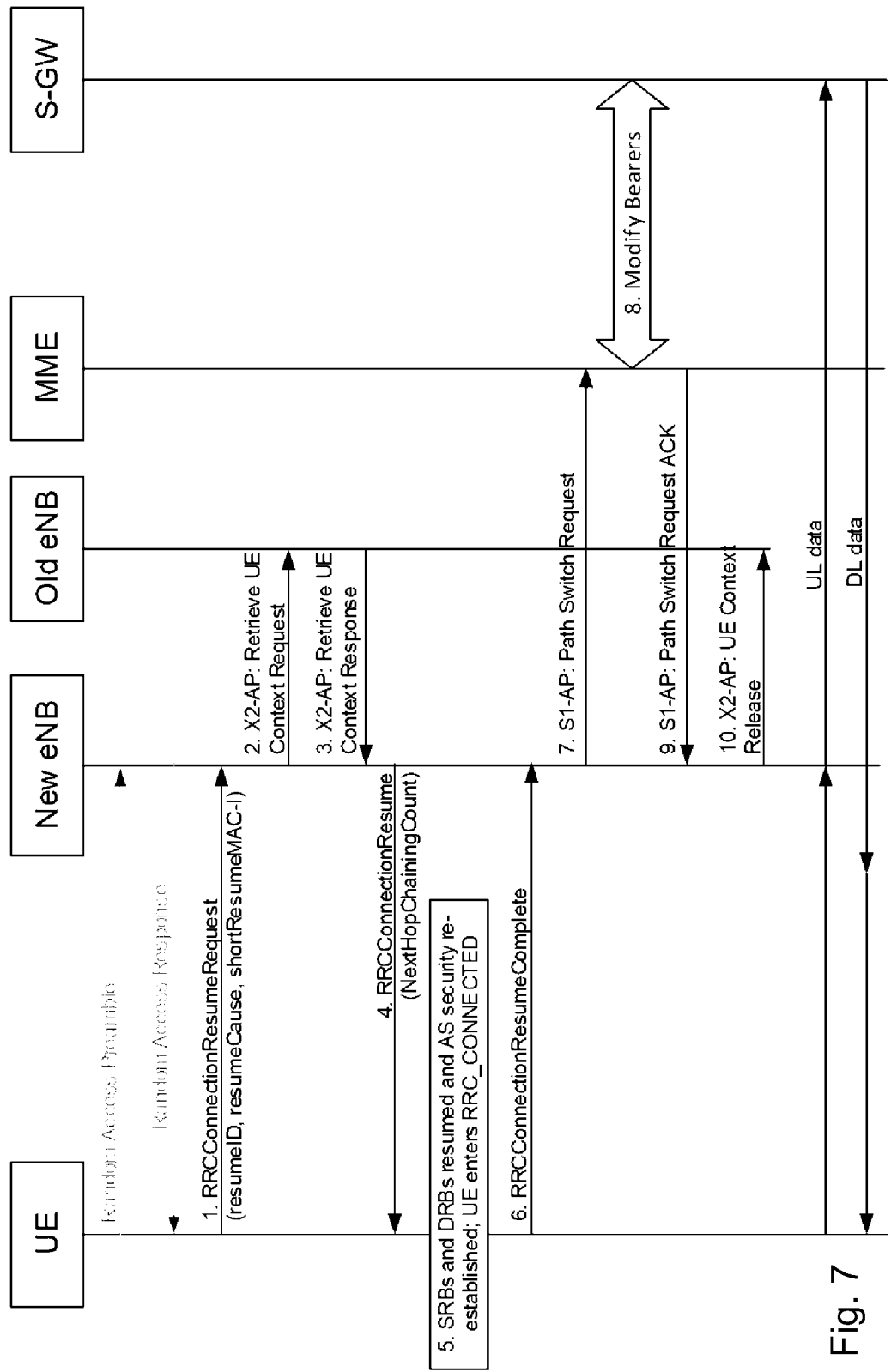
FIG. 7 is a sequence diagram illustrating the RRC connection resume procedure in a new eNB.
Figure 8:
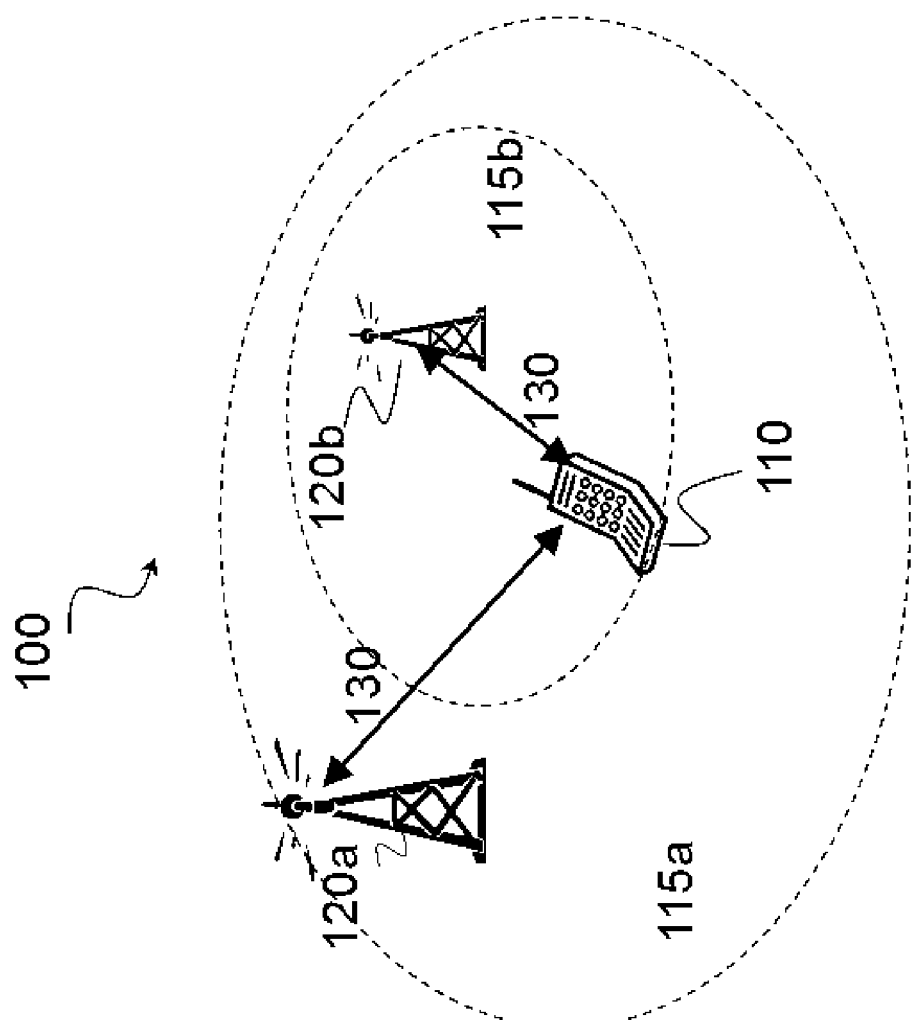
FIG. 8 is a block diagram illustrating an example wireless network, according to a particular embodiment.

FIG. 8 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multi-input multi-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

Wireless signals 130 may be transmitted on time-frequency resources. The time-frequency resources may be partitioned into radio frames, subframes, slots, and/or mini-slots. Network node 120 may dynamically schedule subframes/slots/mini-slots as uplink, downlink, or a combination uplink and downlink. Different wireless signals 130 may comprise different transmission processing times.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, wireless device 110 may have RRC and PDCP connections with network nodes 120. Wireless device 110 and network nodes 120 may perform dual connectivity. For example, wireless device 110 may connect to both network node 120a and network node 120b as described with respect to any of FIGS. 1-7. Wireless device 110 and network nodes 120 may suspend and resume PDCP connections. The PDCP connections may be LTE PDCP connections or NR PDCP connections. Particular examples are described in more detail below with respect to FIGS. 9-12B, for example.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 11A below. Similarly, a network node may include any suitable combination of hardware and/or software. For example, in particular embodiments, a network node, such as network node 120, may include the components described with respect to FIG. 12A below.

In particular embodiments, to accomplish the resumption of bearers to their pre-suspension state upon resumption, an information element is included in the LTE RRC Resume message that contains the NR PDCP configurations for the bearers that are to resume with NR PDCP version.

In some embodiments, the UE will keep the NR PDCP configuration used when the UE was in an RRC connected even after it has left the RRC connected state. When the UE resumes the RRC connected (enter RRC connected state) the network will indicate to the UE that it should resume the NR PDCP configuration. The network may also indicate if any parameters of the NR PDCP configuration should be modified.

Furthermore, in some embodiments, the NR PDCP configuration may be resumed using a different security key and/or security algorithm than that was used before suspension. The security key to be used may be derived in the UE based on previous keys and other parameters provided by the network e.g. Next Hop Chaining Counter (NCC).

In another embodiment of the invention, if a UE using NR PDCP for some or all of its bearers gets suspended and later on is resumed in an eNB that doesn't support NR, the RRC Resume message will not contain the NR PDCP configurations and as such all bearers will resume in LTE PDCP version.

In some embodiments, if a UE using LTE PDCP for all of its bearers gets suspended and later on is resumed in a different eNB, the UE checks to see if that eNB supports NR (e.g., by looking into the broadcast information of the eNB), and if the eNB supports NR, the UE includes an indication in the resume message signifying that it wants to be configured with NR PDCP. The target eNB then responds to this by including in the RRC Resume message it sends to the UE NR PDCP configurations and as such some or all of the bearers can be resumed with NR PDCP.

In particular embodiments, when a UE was being served by an eNB that supports NR PDCP and using NR PDCP for all of or some of its bearers gets suspended, the eNB makes sure that the protocol parameters/configuration such as security parameters (e.g. ciphering algorithms) and sequence number lengths can also be reused in the LTE PDCP, to make sure the UE can be resumed in an eNB that may not support NR PDCP. If the configurations currently used by the NR PDCP of the UE were not compatible with LTE PDCP, a reconfiguration is sent to the UE to change them to compatible values before the UE gets suspended. This reconfiguration can be a separate RRC reconfiguration message, or the RRC suspend command is enhanced to included RRC reconfigurations.

In one embodiment of the invention, when a UE resumes in a different eNB and the target eNB doesn't support NR PDCP, the target eNB makes sure that the LTE PDCP config is included in the configurations of all the bearers (even though it is optional parameter) to ensure that all the bearers will be resumed with LTE PDCP version.

In one embodiment of the invention, the UE's NR capability is part of the UE's context that is saved by the network/UE when the UE is suspended.

In another embodiment of the invention, when a UE is resuming, and the context is being fetched by the target eNB from the source eNB, the source eNB can include the UE's NR capability to the target eNB, either explicitly (e.g. in an X2 message used for context fetching between the two eNBs), or implicitly in the UE context.

In one embodiment, if a UE using LTE PDCP for all of its bearers gets suspended and later on is resumed in a different eNB, and if the target eNB supports NR and it detects that the UE supports NR, the target eNB can include in the RRC Resume message it sends to the UE NR PDCP configurations, even if the UE's bearers were using LTE PDCP before suspension, and as such some or all of the bearers can be resumed with NR PDCP. The NR PDCP parameters that are configured or resumed when the UE returns to an RRC connected state may include sequence number size, status report configuration, discard, or reordering timers.

Figure 9:
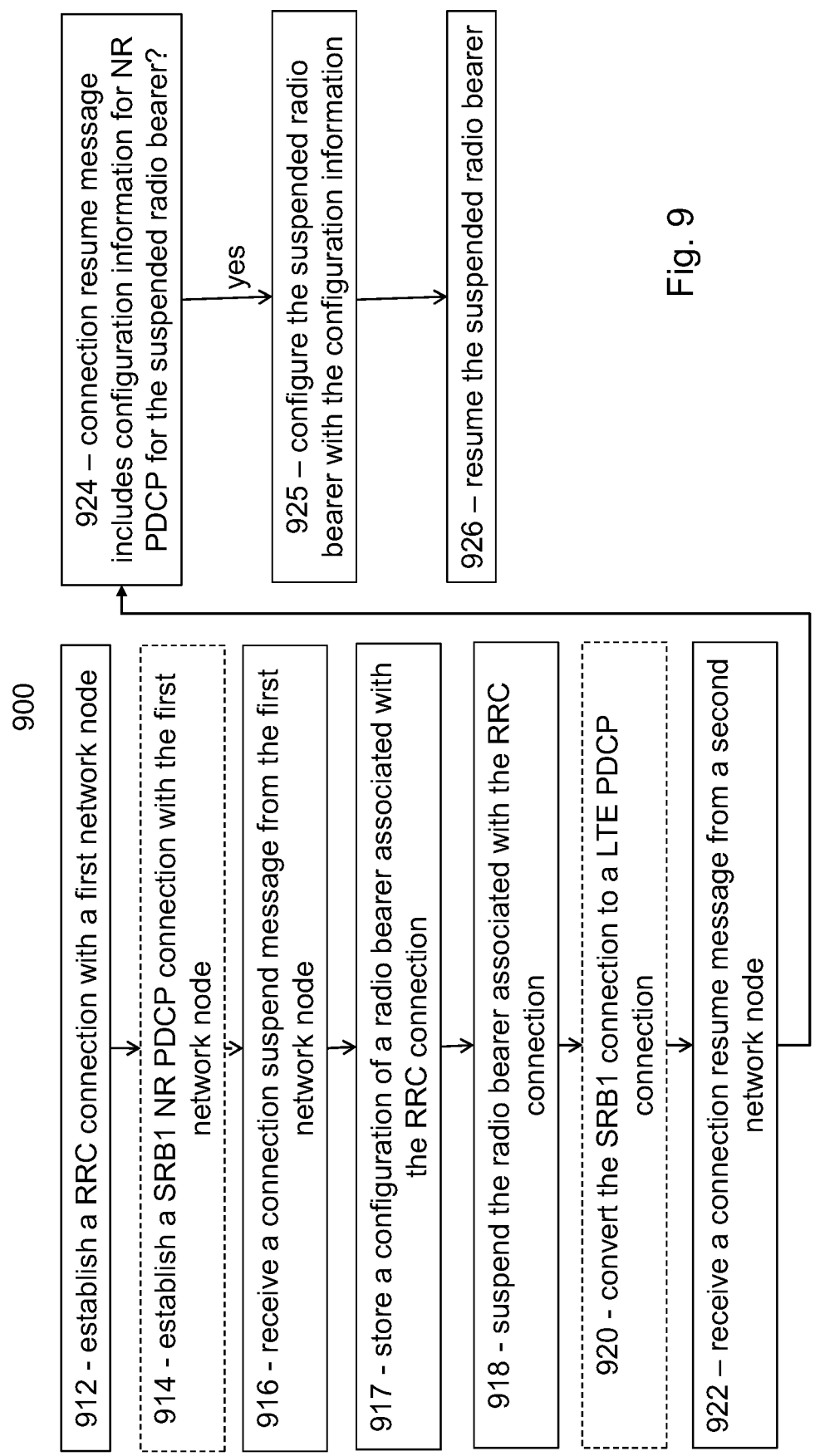
FIG. 9 is a flow diagram illustrating an example method in a wireless device, according to particular embodiments.

Additionally the UE may, upon return to RRC connected, be configured to transmit NR PDCP data over LTE or NR radio or both LTE and NR radio. The UE may also be configured to use NR PDCP for signaling radio bearers (e.g., SRB1, SRB2). The signaling radio bearers may be configured in the UE so that the UE can send or receive signaling over LTE or NR radio or both LTE and NR radio FIG. 9 is a flow diagram illustrating an example method in a wireless device, according to particular embodiments. In particular embodiments, one or more steps of FIG. 9 may be performed by wireless device 110 of network 100 described with respect to FIG. 8.

The method begins at step 912, where a wireless device establishes a RRC connection with a first network node. For example, wireless device 110 may establish a RRC connection with network node 120a.

At step 914, the wireless device may establish an SRB1 NR PDCP connection with the first network node. For example, wireless device 110 may establish an SRB1 NR PDCP connection with network node 120 for transfer of RRC signaling messages.

At step 916, the wireless device receives a connection suspend message from the first network node. For example, wireless device 110 may receive a RRC Suspend message from network node 120a.

At step 917, the wireless device stores a configuration of a radio bearer associated with the RRC connection. The wireless device may store configuration information for a NR PDCP bearer or a LTE bearer. For example, wireless device 110 may store information about an NR bearer connection, such as sequence number information, status information, security information, etc. Wireless device 110 may store the information locally or at the network node, for example, as part of the UE Context. Wireless device 110 may store the information according to any of the embodiments or examples described above.

At step 918, the wireless device suspends the radio bearer associated with the RRC connection. For example, wireless device 110 may suspend the NR or LTE PDCP radio bearer.

At step 920, the wireless device may convert the SRB1 NR PDCP connection to a LTE PDCP connection. For example, wireless device 110 may convert the SRB1 connection established at step 914 into an LTE PDCP connection. A particular advantage is that if any of the suspended bearers are resumed in a different network node that may not support NR, then the wireless device may use the LTE PDCP configuration for the SRB1 to send an RRC resume request to the network node.

At step 922, the wireless device receives a connection resume message from a second network node. In some embodiments, the second network node may be the same as the first network node. In other embodiments, the second network node may be different than the first network node.

As one example, wireless device 110 may receive a RRC Resume message from network node 120a. As another example, wireless device 110 may have moved into range of network node 120b and may receive a RRC Resume message from network node 120b.

At step 924, the wireless device determines whether the connection resume message includes configuration information for NR PDCP for the suspended radio bearer. For example, wireless device 110 may determine the RRC Resume message includes information for configuring a NR PDCP bearer. The method continues to step 925.

At step 925, the wireless device configures the suspended radio bearer with the configuration information. For example, wireless device 110 configures the suspended radio bearer with the configuration information. In some embodiments, wireless device 110 may use a combination of the received configuration and the stored configuration to configure the connection.

At step 926, the wireless device resumes the suspended radio bearer. For example, wireless device 110 may resume a NR or LTE radio bearer based on the configuration from the previous step. The wireless device may resume the radio bearer according to any of the embodiments or examples described above.

Modifications, additions, or omissions may be made to method 900 of FIG. 9. Additionally, one or more steps in the method of FIG. 9 may be performed in parallel or in any suitable order. As one example, step 916 may be performed after steps 917 or 918 in some embodiments. As another example, step 917 may be performed earlier or later. The steps may be repeated over time as necessary.

Figure 10:
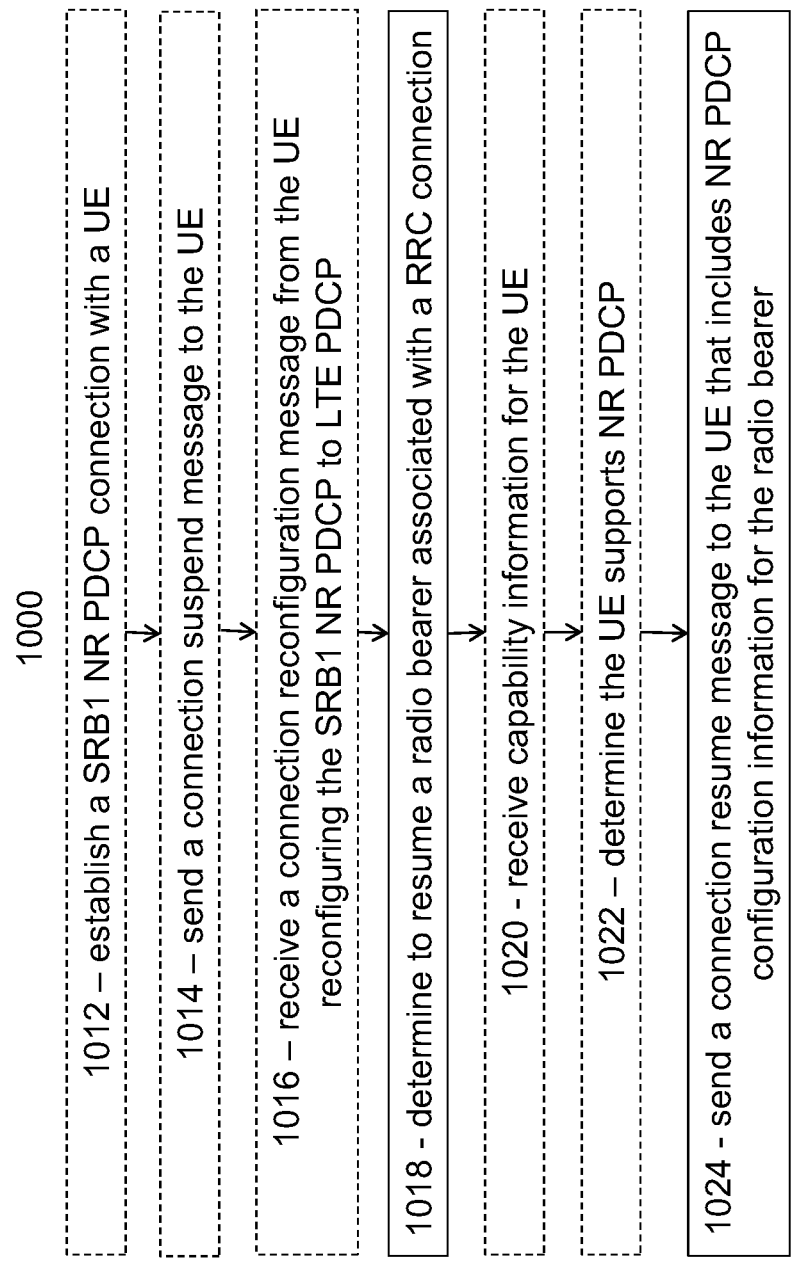
FIG. 10 is a flow diagram illustrating an example method in a network node, according to particular embodiments.

FIG. 10 is a flow diagram illustrating an example method in a network node, according to particular embodiments. In particular embodiments, one or more steps of FIG. 10 may be performed by network node 120 of network 100 described with respect to FIG. 8.

The method may begin at step 1012, where a network node establishes a SRB1 NR PDCP connection with a UE. For example, network node 120 may establish a SRB1 NR PDCP connection with wireless device 110 for transfer of RRC signaling messages.

At step 1014, the network node may send a connection suspend message to the UE. For example, network node 120 may send a connection suspend message to wireless device 110 to suspend one or more radio bearers.

At step 1016, the network node may receive a connection reconfiguration message from the UE reconfiguring the SRB1 from NR PDCP to LTE PDCP. For example, network node 120 may receive a connection reconfiguration message from wireless device 110. Wireless device may send the reconfiguration message, for example, in case the wireless device resumes PDCP bearer connections with a different network node that does not support NR PDCP.

At step 1018, the network node determines to resume, with a UE, a radio bearer associated with a RRC connection. For example, network node 120b may receive a RRC resume request from wireless device 110 to resume a radio bearer. In some embodiments, the bearer connection may include any suitable bearer connection.

At step 1020, the network node may receive capability information for the UE. For example, network node 120 may receive capability information from wireless device 110 indicating capabilities of wireless device 110, such as a capability for communicating using NR PDCP or LTE PDCP.

At step 1022, the network node determines the UE is capable of supporting NR PDCP based on the capability information. For example, network node 120 may determine wireless device 110 is capable of supporting NR PDCP based on the received capability information.

In some embodiments, the network node may receive NR configuration information for the bearer connection from another network node. For example, network node 120b may receive configuration information from network node 120a if wireless device 110 was previously connected to network node 120a before the bearer was suspended. The network node may receive NR configuration information according to any of the embodiments or examples described above.

At step 1024, the network node sends a connection resume message to the UE. The connection resume message includes configuration information for NR PDCP for the radio bearer. For example, network node 120b may send a RRC Resume message to wireless device 110. The configuration information may include NR or LTE configuration information. The configuration information may include information according to any of the embodiments or examples described above.

Modifications, additions, or omissions may be made to method 1000 of FIG. 10. Additionally, one or more steps in the method of FIG. 10 may be performed in parallel or in any suitable order. The steps may be repeated over time as necessary.

Figure 11B:
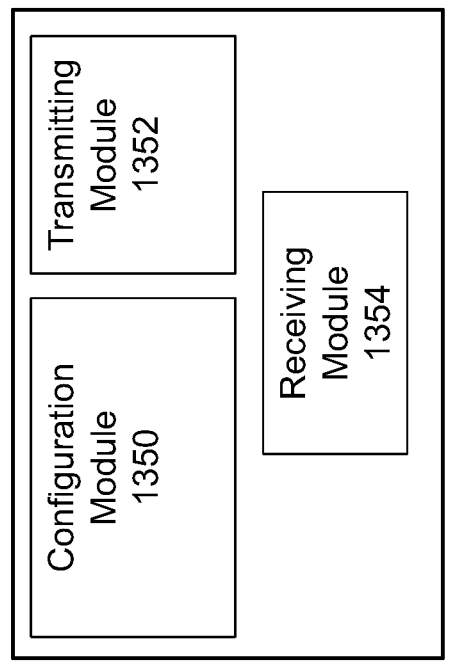
FIG. 11B is a block diagram illustrating example components of a wireless device.
Figure 11A:
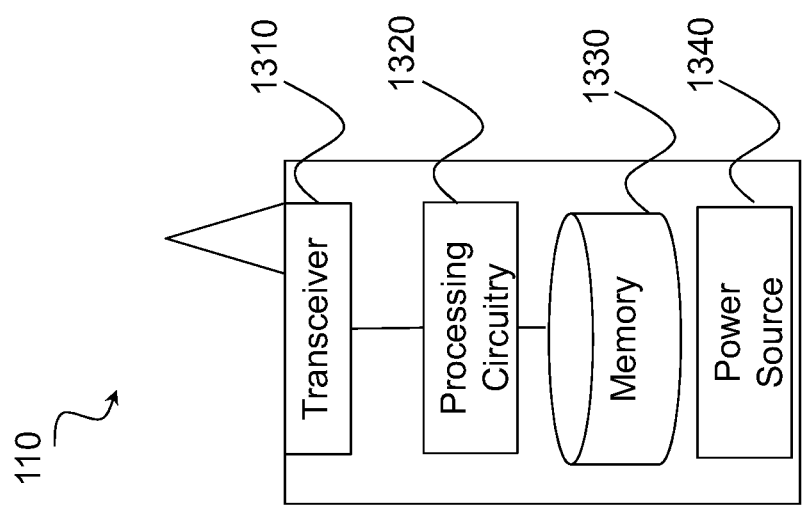
FIG. 11A is a block diagram illustrating an example embodiment of a wireless device.

FIG. 11A is a block diagram illustrating an example embodiment of a wireless device. The wireless device is an example of the wireless devices 110 illustrated in FIG. 8. In particular embodiments, the wireless device is capable of pausing and resuming NR bearer connections.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 11A) responsible for providing certain aspects of the wireless device's functionality, including any of the functionality described above and/or any additional functionality (including any functionality necessary to support the solution described above).

FIG. 11B is a block diagram illustrating example components of a wireless device 110. The components may include configuration module 1350, transmitting module 1352 and receiving module 1354.

Configuration module 1350 may perform the configuration functions of wireless device 110. For example, configuration module 1350 may establish a RRC connection, suspend a radio bearer associated with a RRC connection, determine whether the connection resume message includes configuration information for NR PDCP for the suspended radio bearer, configure a suspended radio bearer with configuration information, and resume suspended radio bearers according to any of the examples and embodiments described above. In certain embodiments, configuration module 1350 may include or be included in processing circuitry 1320. In particular embodiments, configuration module 1350 may communicate with transmitting module 1352 and receiving module 1354.

Transmitting module 1352 may perform the transmitting functions of wireless device 110. For example, transmitting module 1352 may establish radio bearers with network node 120 and/or send configuration information to network node 120 according to any of the examples and embodiments described above. In certain embodiments, transmitting module 1352 may include or be included in processing circuitry 1320. In particular embodiments, transmitting module 1352 may communicate with scheduling module 1350 and receiving module 1354.

Receiving module 1354 may perform the receiving functions of wireless device 110. For example, receiving module 1354 may receive suspend and resume messages from network node 120 according to any of the examples and embodiments described above. In certain embodiments, receiving module 1354 may include or be included in processing circuitry 1320. In particular embodiments, transmitting module 1352 may communicate with scheduling module 1350 and transmitting module 1352.

Figure 12B:
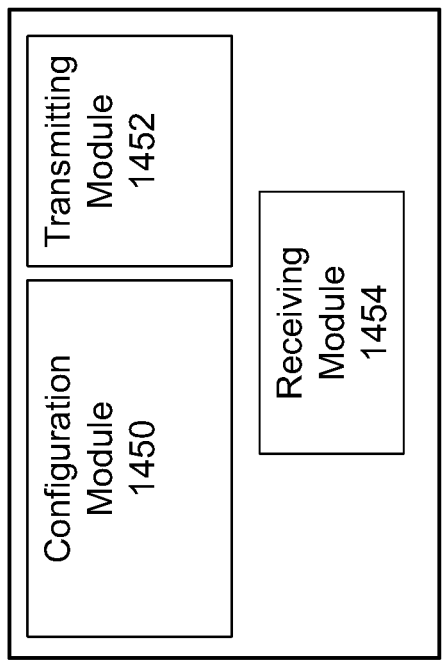
FIG. 12B is a block diagram illustrating example components of a network node.
Figure 12A:
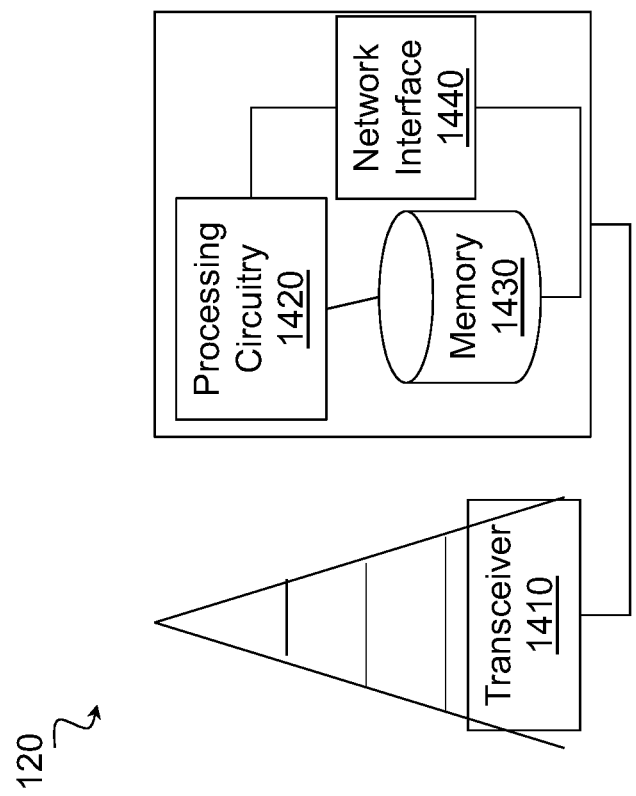
FIG. 12A is a block diagram illustrating an example embodiment of a network node.

FIG. 12A is a block diagram illustrating an example embodiment of a network node. The network node is an example of the network node 120 illustrated in FIG. 8. In particular embodiments, the network node is capable of pausing and resuming NR bearer connections.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 11A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

FIG. 11B is a block diagram illustrating example components of a network node 120. The components may include configuration module 1450, transmitting module 1452 and receiving module 1454.

Configuration module 1450 may perform the configuration functions of network node 120. For example, configuration module 1450 may determine to resume a radio bearer and/or configure a radio bearer according to any of the examples and embodiments described above. In certain embodiments, configuration module 1450 may include or be included in processing circuitry 1420. In particular embodiments, configuration module 1450 may communicate with transmitting module 1452 and receiving module 1454.

Transmitting module 1452 may perform the transmitting functions of network node 120. For example, transmitting module 1452 may send radio bearer configuration information to another network node, and/or resume messages to a wireless device according to any of the examples and embodiments described above. In certain embodiments, transmitting module 1452 may include or be included in processing circuitry 1420. In particular embodiments, transmitting module 1452 may communicate with configuration module 1450 and receiving module 1454.

Receiving module 1454 may perform the receiving functions of network node 120. For example, receiving module 1454 may receive radio bearer configuration information from another network node or a wireless device according to any of the examples and embodiments described above. In certain embodiments, receiving module 1454 may include or be included in processing circuitry 1420. In particular embodiments, transmitting module 1452 may communicate with configuration module 1450 and transmitting module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations Used in the Preceding Description Include

3GPP Third Generation Partnership Project
5G Fifth Generation
BBU Baseband Unit
BTS Base Transceiver Station
CC Component Carrier
D2D Device to Device
DC Dual Connectivity
eMBB Enhanced Mobile Broadband
eNB eNodeB
EPC Evolved Packet Core
EPS Evolved Packet System
FDD Frequency Division Duplex
FFT Fast Fourier Transform
gNB Next-generation NodeB
LAA Licensed-Assisted Access
LBT Listen-before-talk
LTE Long Term Evolution
LTE-U LTE in Unlicensed Spectrum
MeNB Master eNB
M2M Machine to Machine
MCG Master Cell Group
MIB Master Information Block
MIMO Multi-Input Multi-Output
MTC Machine Type Communication
NAS Non-Access Stratum
NR New Radio
OFDM Orthogonal Frequency Division Multiplexing
PCM Parity Check Matrix
PDCP Packet Data Convergence Protocol
PRB Physical Resource Block
QoS Quality of Service
RAN Radio Access Network
RAT Radio Access Technology
RBS Radio Base Station
RNC Radio Network Controller
RRC Radio Resource Control
RRH Remote Radio Head
RRU Remote Radio Unit
SAE System Architecture Evolution
SCell Secondary Cell
SCG Secondary Cell Group
SeNB Secondary eNB
SI System Information
SIB System Information Block
SRB Signaling Radio Bearer
TDD Time Division Duplex
TNL Transport Network Layer
UE User Equipment
UL Uplink
UTRAN Universal Terrestrial Radio Access Network
WAN Wireless Access Network

The invention claimed is:

1. A method for use in a user equipment (UE) of resuming a radio bearer in a wireless communication network, the method comprising:
   establishing a radio resource control (RRC) connection with a first network node;
   establishing a signaling radio bearer 1 (SRB1) with an NR Packet Data Convergence Protocol (PDCP) configuration;
   receiving a connection suspend message from the first network node;
   suspending the SRB1;
   receiving a connection resume message via the SRB1;
   responsive to the connection resume message including PDCP configuration information, configuring the SRB1 with a PDCP configuration; and
   resuming the SRB1.

2. The method of claim 1, wherein configuring the SRB1 comprises using the PDCP configuration information in the connection resume message and stored configuration information.

3. The method of claim 2, wherein the PDCP configuration information in the connection resume message takes precedence over the stored configuration information.

4. The method of claim 1, wherein the connection resume message includes indicates security information to be used that is different from the security information used prior to suspension of the SRB1.

5. The method of claim 4, wherein the security information comprises security key information or security algorithm information.

6. The method of claim 1, further comprising:
   responsive to the connection resume message not including NR PDCP configuration information for the SRB1, resuming the SRB1 as a long term evolution (LTE) PDCP bearer.

7. The method of claim 1, further comprising:
   upon receiving the connection suspend message, converting the SRB1 to a long term evolution (LTE) PDCP configuration.

8. A user equipment (UE) capable of resuming a radio bearer in a wireless communication network, the UE comprising processing circuitry-operable to:
   establish a radio resource control (RRC) connection with a first network node;
   establish a signaling radio bearer 1 (SRB1) with an NR Packet Data Convergence Protocol (PDCP) configuration;
   receive a connection suspend message from the first network node;
   suspend the SRB1;
   receive a connection resume message via the SRB1;
   responsive to the connection resume message including PDCP configuration information, configure the SRB1 with a PDCP configuration; and
   resume the SRB1.

9. The user equipment of claim 8, wherein the processing circuitry is operable configure the SRB1 by using the PDCP configuration information in the connection resume message and stored configuration information.

10. The user equipment of claim 9, wherein the PDCP configuration information in the connection resume message takes precedence over the stored configuration information.

11. The user equipment of claim 8, wherein the connection resume message indicates security information to be used that is different from the security information used prior to suspension of the SRB1.

12. The user equipment of claim 11, wherein the security information includes security key information or security algorithm information.

13. The user equipment of claim 8, the processing circuitry further operable to, responsive to the connection resume message not including NR PDCP configuration information for the SRB1, resume the SRB1 as a long term evolution (LTE) PDCP bearer.

14. The user equipment of claim 8, the processing circuitry further operable to:
   upon receiving the connection suspend message, convert the SRB1 connection to a long term evolution (LTE) PDCP configuration.

* * * * *